United States Patent [19]

Kohler et al.

[11] Patent Number: 4,639,065
[45] Date of Patent: Jan. 27, 1987

[54] WINDSHIELD WIPER MOTOR

[75] Inventors: Alfred Kohler, Bietigheim; Theodor Schneider, Freudental; Karl F. Schubert, Bietigheim, all of Fed. Rep. of Germany

[73] Assignee: SWF Auto-Electric GmbH, Bietigheim-Bissingen, Fed. Rep. of Germany

[21] Appl. No.: 711,603

[22] Filed: Mar. 14, 1985

[30] Foreign Application Priority Data

Mar. 16, 1984 [DE] Fed. Rep. of Germany ....... 3409680

[51] Int. Cl.⁴ .......................................... H01R 13/514
[52] U.S. Cl. .................................... 339/119 R; 310/83
[58] Field of Search ............... 339/119 R, 121, 126 R; 310/83, 99; 318/466, 468

[56] References Cited

U.S. PATENT DOCUMENTS 2,464,847 3/1949 Coffey ............................ 310/83 UX
4,369,387 1/1983 Haar et al. ............................ 310/83

FOREIGN PATENT DOCUMENTS 2004474 1/1970 Fed. Rep. of Germany ...... 339/121

Primary Examiner—Eugene F. Desmond
Attorney, Agent, or Firm—Donald J. Lenkszus

[57] ABSTRACT

This invention describes an electric motor on whose gear housing cap are secured plug contacts for a mating plug. Pin terminals which project perpendicularly from the gear housing cap are used as plug contacts. Various pin terminals are fixed on the cap, while other pin terminals are carried by a separate structural member which may be locked on the cap.

19 Claims, 7 Drawing Figures

WINDSHIELD WIPER MOTOR

BACKGROUND OF THE INVENTION

This invention relates to an electric motor and in particular to a windshield wiper motor.

From German specification AS 2,658,746 an electric motor is known, in which a plug housing is fastened on a housing cap. Plug contacts are secured parallel to each other in the plug housing for connection to a mating plug. These plug contacts are formed as flat-pin terminals and arranged substantially parallel to the cap. Plug contacts for switch springs have a rectangularly projecting stud penetrating the cap. On this stud are riveted switch springs for a limit switch. The plug contacts for the motor supply leads are also positioned substantially parallel to the cap, whereby in the plug-in direction the motor supply leads are soldered to the end of the said flat-pin terminals.

However some motor vehicle manufacturers demand that the plug contacts be formed as round pins and/or receptacles, and in which the supply leads to these pins each projects into a bore of the pin transversely to the plug-in direction. A design according to the German specification AS 2,658,746 cannot easily be realized when such round pins are used. Therefore, until now soldering terminals have been provided on the motor housing on which is fixed a cable set which leads into a separate plug housing in which the round plug contacts are secured. However this design is very complicated in its production and assembly.

The invention is therefore based on the problem of developing an electric motor of the kind mentioned above in such a way that a cable set between the electric motor and a plug housing for the connection of the mating plug is omitted.

Economical production and assembly is only possible, if the switch springs can be directly fitted on the round pins and/or receptacles. However this is not possible, if these pins and/or receptacles are secured in parallel to the cap, because these pins and/or receptacles in most cases are formed as a part turned on a lathe and therefore cannot have a rectangularly projecting stud which could penetrate the cap. In accordance with the present invention these round pins and/or receptacles are fastened perpendicularly on the cap. An elongated portion of these round pins can then penetrate the cap so that the switch springs can be directly secured on the pins and/for receptacles. Thus a principal feature of the present invention is that the plug-in direction is changed in comparison with the prior art arrangements.

In one embodiment of the invention, all plug contacts are finally secured in the plug housing which itself is injection-moulded on the metal cap. In another embodiment of the invention only the pins and/or receptacles for the switch springs are fixed on the cap, while the pins and/or receptacles for the motor supply leads are carried on structural member which may be detachably secured on the outside of the cap. Thus pins and receptacles available on the market could be used, onto which are soldered the motor supply leads in a radially projecting way. The motor supply leads already provided with pins are then secured in this separate structural member and together with the latter fixed on the motor housing.

The separate structural member with the pins for the motor supply leads can be secured on the housing cap independently of the pins for the switch springs. However due to different tolerances it is not possible to use an integral counter plug for all pins. Therefore according to an especially preferred development of the invention this structural member has several bores. In some bores the pins for the motor supply leads are conducted and through other bores of this structural member the pins which are secured to the cap project. In this way it is ensured that the position of all pins and/or receptacles matches the arrangement of the corresponding pins and/or receptacles on the mating plug, so that an integral mating plug can be used without difficulty.

BRIEF DESCRIPTION OF THE DRAWING

The invention will be better understood from a reading of the following detailed description in conjunction with the drawings in which.

DETAILED DESCRIPTION

Figure 1:
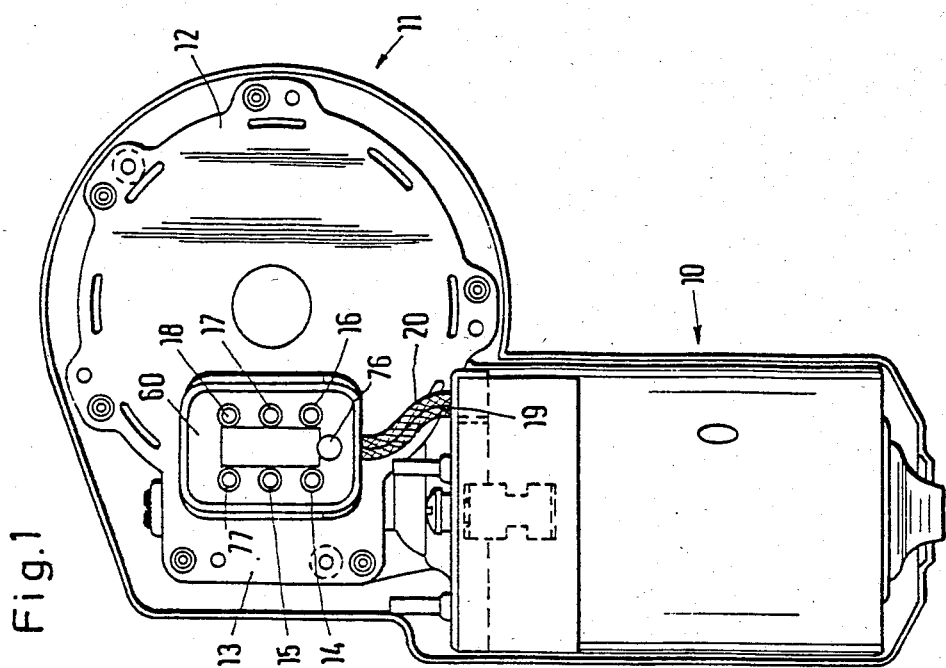
FIG. 1 is a view of a wiper motor.

The wiper motor of FIG. 1 includes a motor housing 10 and a gear housing 11 flanged thereon in a known manner. The gear housing 11 is closed by a cap 12 pressed out of a metal blank. The cap 12 is substantially circular, however it has a rectangular stud 13 above the motor armature shaft which is not shown. On cap 12 are fastened a total of five pins 14, 15, 16, 17 and 18. Pins 14 and 15 are connected with the motor supply lead 19 and 20. Pins 14 and 15 are arranged in the area of rectangular stud 13, while the other pins 16, 17 and 18 for the switch springs are located in the area of the circular cap. With this arrangement only short motor supply leads are necessary.

Figure 3:
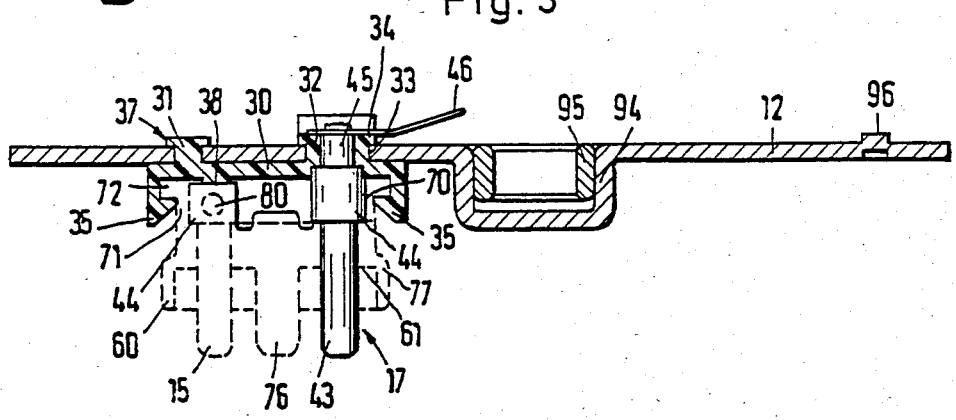
FIG. 3 is a sectional view of the motor of FIG. 1 taken on the line III—III.

A substantially rectangular plate 30 of plastic material is injection-moulded on the outside of the metallic cap. As seen in FIG. 3 fastening projections 31 penetrate bores in the cap 12. In addition, insulating receptacles 32 are formed integrally on the plate 30. The receptacles 32 line bores 33 in the cap 12. On the back side of the cap each insulating receptacle 32 has a circumferential flange 34 and thus also serves to secure the plate 30 to the cap 12. Furthermore, locking elements 35 are formed on both sides of this plate 30.

Figure 5:
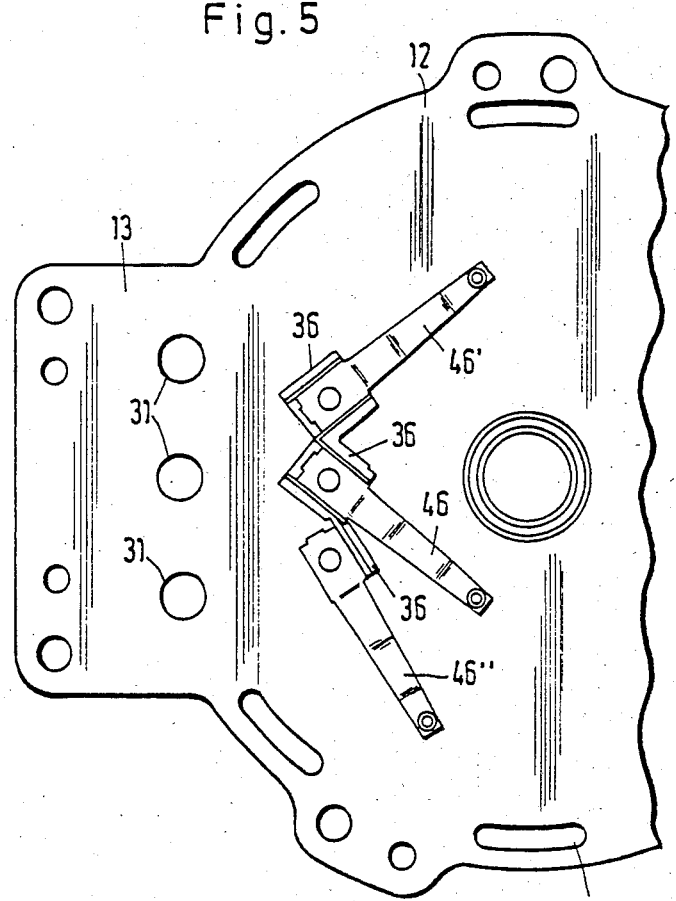
FIG. 5 is a view of a portion of the back side of the gear housing cap of FIG. 1.

As shown in FIG. 5 the back side of the cap 12 includes injection-moulded insulating webs 36, whose function will be described later. The parts 30 to 36 are integrally injection-moulded from plastic material onto the cap 12. This structural member can also be regarded as a bottom 37 of a plug housing.

Figure 2:
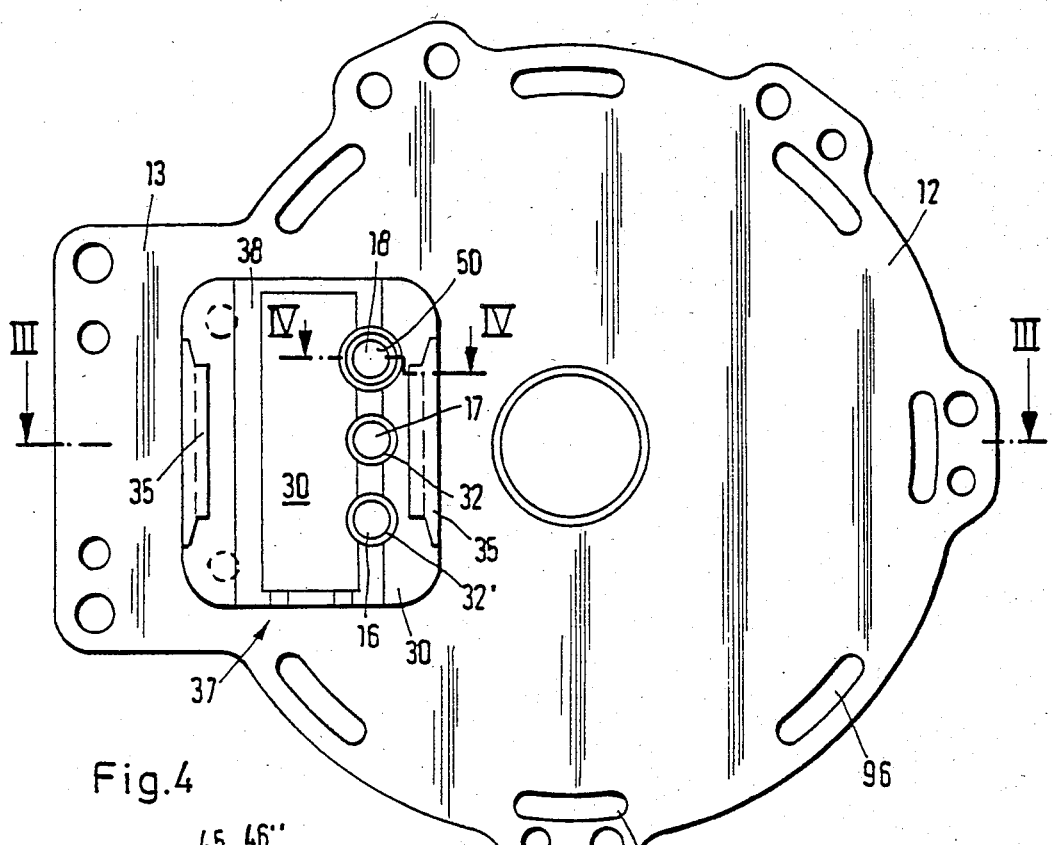
FIG. 2 is a view of a gear housing cap

As shown in FIGS. 1-3 round pins 16, 17 and 18 are provided as plug contacts. However receptacles can take the place of these pins. Pin 17 includes a plug-in portion 43 for engaging the receptacle of a mating plug which is not shown in detail. This plug-in portion 43 is followed by a stop collar 44 having a larger diameter. A guide portion 45 penetrates the insulating receptacle 32. A switch spring 46 is riveted on the free front face of guide portion 45 in a radially projecting manner. Thereby stop collar 44 is supported on plate 30, and switch spring 46 is supported as a counter bearing on flange 34 of the receptacle. Thus when switch spring 46 is fastened by riveting, pin 17 is also attached to cap 12. As FIG. 3 clearly shows, pin 17 projects perpendicularly from cap 12.

Figure 4:
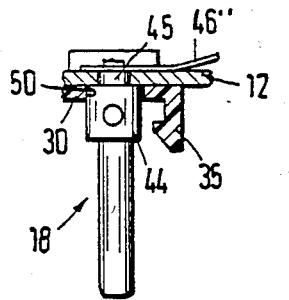
FIG. 4 is a partial section of a portion of the motor of FIG. 1 taken on the line IV-IV.

As shown in the detailed section drawing of FIG. 4 a pin 18 is directly riveted on the metallic cap 12 and connected with it in an electrically conductive manner. For this purpose the plate 30 has a bore 50 with a diameter larger than the diameter of stop collar 44, which thus rests directly against the cap. A short guide portion 45 of the pin 18 is let-in flush in a bore of cap 12. Switch spring 46" lies directly against the back side of the cap 12. Pin 18 is anchored on the cap 12 when the switch spring 46" is riveted on.

As seen in FIG. 2 two insulating receptacles 32 and 32' are arranged in a row with the enlarged bore 50 on the plate 30. Pins 16 and 17 are plugged in the insulating receptacles 32 and 32' on whose back side the switch springs 46 and 46' are secured. A further switch spring 46" is secured on the round pin 18. The insulating webs 36 serve to protect pins 16, 17' and 18 against twisting.

In summary, the plug contacts for the switch springs are formed as round pins. These pins project approximately perpendicularly from the cap and are secured thereon. The pins for the switch springs penetrate the cap and the switch springs are directly fixed on these pins.

Figure 6:
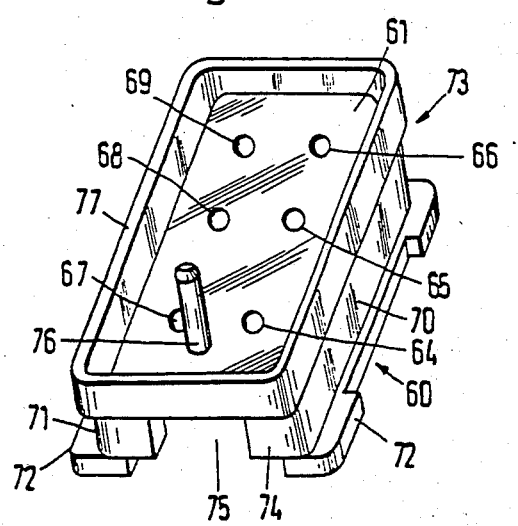
FIG. 6 is a perspective view of a top of a plug housing.

In contrast pins 14 and 15 for the motor supply leads are not directly secured on the cap 12. For this purpose there is provided a separate structural member 60 of plastics material, which is shown in a perspective view in FIG. 6. Structural member 60 can be regarded as a top of a plug housing. This top is generally box-shaped and has a rectangular base 61 with six bores 64 to 69, of which three each are arranged in one row. Two longitudinal walls 70 and 71 project from base 61 and as shown in FIG. 3 each has a projecting web 72 for lockingly engaging elements 35 on the bottom 37. Moreover, top 70 has two transverse walls 73 and 74. A recess 75 is provided in transverse wall 74. A pin 76 projects from base 61 and engages in a corresponding recess of the mating plug, so that the latter can only be put on the pins in a defined position. A circumferential collar 77 projects from base 61 and serves as a guide surface for the mating plug.

Pins 14 and 15 for the motor supply leads 19 and 20 are secured in top 60. As shown in FIG. 3 these pins have only one stop collar 44 which is supproted between base 61 and a web 38 of the bottom 37. The stop collar 44 of these pins 14 and 15 is penetrated by a bore 80 in which the motor supply lead is inserted and soldered. The motor supply leads are conducted outwards through the recess 75 in the transverse wall 74 of the top 60.

During assembly pins 16, 17 and 18 are first plugged in the cap 12 already equipped with a bottom 37. Then the switch springs are riveted on these pins. The motor supply leads coming from the brush plate of the motor are already riveted with the pins 14 and 15. These pins are plugged in the matching bores of the top 60 and thereafter the top is locked with the bottom.

In this preferred embodiment only the pins for the switch springs are fixedly secured on the cap, while the pins for the motor supply leads are on a separate structural member which may in turn be detachably secured to the outside of the cap. Thereby the pins for the switch springs and the pins for the motor supply leads penetrate bores of an integrally produced top, so that their position relative to one another is clearly defined. The pins 16, 17 and 18 for the switch springs are positioned in the bores 64, 65 and 66, which are all arranged in a first row on the top 60. Pins 14 and 15 for the motor supply leads penetrate the bore 67 and 68 in a second row. Bore 69 in the top 60 is not used.

Figure 7:
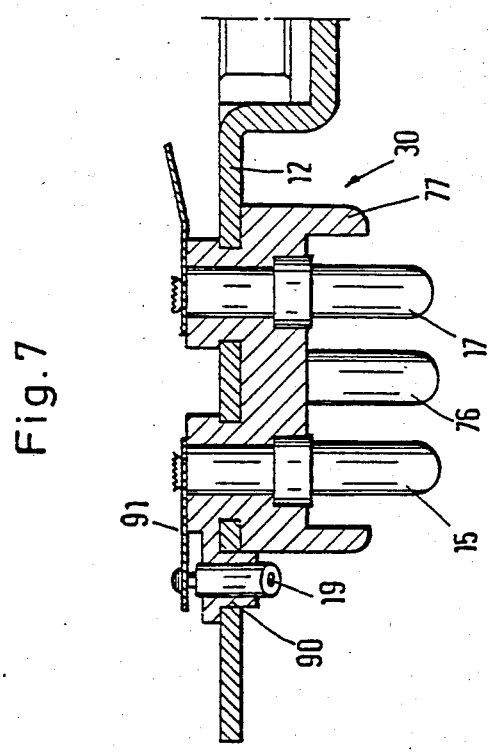
FIG. 7 is a partial section similar to that of FIG. 3 through another embodiment.

FIG. 7 shows a second embodiment of the invention, in which round pins are used which are perpendicularly secured to the gear housing cap. However in this embodiment all pins are secured to the cap 12. The motor supply leads penetrate a bore 90 in the cap 12 and are soldered to a soldering eye 91. This soldering eye is riveted on the associated pin 15. This embodiment has the advantage that uniformly sized pins can be used and top 60 of FIG. 6 can be omitted. Plate 30 which is injection-moulded on cap 12 takes over the function of the top 60. However the motor supply lead has to be soldered to the soldering eye 91. In contrast thereto in the previously described embodiment no soldering operation is necessary.

In a modified version of the embodiment all pins are locked on the cap, but the motor supply leads are nevertheless soldered to the appropriate pins 14 and 15 outside of the gear housing. However this entails difficulties, because the plastic plate 30 could be deformed by the heat.

The basic ideas of the present invention can of course be also realized, if the gear housing cap 12 is made of plastic material. In this case the pins are directly secured to the cap during the injection-moulding process.

Customarily the switch springs 46 cooperate with contact paths of a switch wafer which is fastened to the output shaft. It is therefore important that the cap 12 is accurately aligned with respect to the output shaft and/or the switch wafer. For this purpose, on the cap 12, studs 96 are embossed concentrically to a bearing 95 seated in a cap bulge 94. The studs 96 fit accurately in a flush manner in the cylindric rim of the gear housing. The cylindric rim of the gear housing is exactly coaxial to the corresponding bearing recess in the gear housing. Because studs 96 and bulge 94 in the cover can be produced in one work cycle and thereby a concentric position is reliably ensured, the cap can be very exactly aligned relative to the gear housing. The bearing in the gear housing and the bearing 95 in the cap are exactly in alignment with each other. It is also ensured that the switch springs 46 are in exact alignment with the contact paths of the switch wafer.

What is claimed is:

1. An electric wiper motor for motor vehicles, comprising:
   a gear housing;
   a cap covering said gear housing;
   a plurality of plug contacts projecting from the outside of said cap for the connection of a mating plug;
   a plurality of switch springs fixed to selected ones of said plug contacts, within said gear housing said selected ones of said plug contacts being fixed to said cap;
   at least one of said plug contacts coupled to a motor supply lead;
   and wherein
   all of said plurality of plug contacts are formed as round pins and/or receptacles, said pins and/or receptacles project at least substantially perpendicularly from said cap, and the pin and/or the receptacle for said motor supply lead is guided at a structural member which is detachably secured to the outside of said cap.

2. An electric motor in accordance with claim 1, wherein:
all of said pins and/or receptacles are secured on the cap.

3. An electric motor in accordance with claim 2, wherein:
said pin and/or the receptacle for said motor supply lead penetrates said cap.

4. An electric motor according to claim 3, wherein:
said motor supply lead is conducted into the interior of said gear housing through at least one bore in said gear housing and in the said gear housing is connected in an electrically conductive manner with one of said pins and/or receptacles.

5. An electric motor in accordance with claim 3, wherein:
said gear housing cap is substantially circular with a rectangular stud and includes a bottom; and
said bottom is at least partially injection-moulded on said rectangular stud.

6. An electric motor in accordance with claim 5, wherein:
said pin and/or receptacle for said motor supply lead is arranged in the area of said rectangular stud.

7. An electric motor in accordance with claim 1 wherein:
said motor supply lead is secured to one of said pins outside said gear housing.

8. An electric motor in accordance with claim 1 wherein:
said structural member has several bores;
said pin and/or the receptacle for said motor supply lead is guided in at least one of said bores; and
said pins and/or receptacles for said switch springs project through other ones of said bores.

9. An electric motor in accordance with claim 8, wherein:
said bores are arranged in two adjacent rows of three bores;
said pins and/or receptacles for said switch springs penetrate all bores of one of said rows; and
said pin and/or receptacle for said motor supply lead is guided in a bore of the other row.

10. An electric motor in accordance with claim 1 wherein:
said cap includes a portion made of plastic material by an injection-moulded process; and
at least the pins and/or receptacles for the switch springs are immovably fixed on said cap during the injection-moulded process.

11. An electric motor in accordance with claim 1, wherein:
said structural member has a bore and a circumferential collar projecting from said base as a guide surface for a mating plug.

12. An electric motor in accordance with claim 1, wherein:
said gear housing has a cylindric rim coaxially arranged with respect to a bearing for an output shaft;
said cap has a bulge, a bearing in said bulge for said output shaft and studs embossed concentrically to the said bulge; and
the outer diameter of said studs corresponds to the inner diameter of the gear housing rim.

13. An electric motor in accordance with claim 1 wherein:
said cap is pressed from a metal blank;
several insulating receptacles are secured on said metal blank, said insulating receptacles each line one bore in said metal blank; and
said pins and/or receptacles are inserted in said insulating receptacles each with a guide portion.

14. An electric motor in accordance with claim 13, wherein:
one of said pins and/or receptacles is directly anchored in a bore of said metal blank and is thus connected with this metal blank in an electrically conductive manner.

15. An electric motor in accordance with claim 13 comprising:
plate means on said cap, said plate means having insulating receptacles; and wherein:
said pins and/or receptacles for said switch springs each have a stop collar with a larger diameter between a plug portion and a guide portion penetrating said insulating receptacle; and
each of said switch springs is secured in a radially projecting manner on the free front face of said guide portion of one of said pins.

16. An electric motor in accordance with claim 15, wherein:
all of said insulating receptacles are injection-moulded as a single piece with a bottom portion on said metal blank; said bottom portion having locking elements; and comprising: a structural member locked on said cap at a spacing from it by means of the said locking elements.

17. An electric motor in accordance with claim 16, wherein:
said pin and/or receptacle for said motor supply lead has a stop collar with enlarged diameter, said stop collar being captured between said structural member and a supporting web of said bottom portion.

18. An electric motor in accordance with claim 17, wherein:
said stop collar is provided with a first bore transversely to the plug-in direction; and that said motor supply lead is inserted in said first bore and soldered there.

19. An electric motor in accordance with claim 18, wherein:
said structural member is box-shaped;
said base has bores for said pins and/or receptacles;
said structural member having two opposite side walls lockingly engaging said bottom; and
said motor supply lead is conducted into a plug housing formed by said bottom and said structural member through a recess in a transverse wall of said structural member.

* * * * *